Feb. 24, 1925.　　　　　　　　　　　　　　　　　　　1,527,328
B. PERCICH
RAT TRAP
Filed Oct. 10, 1923
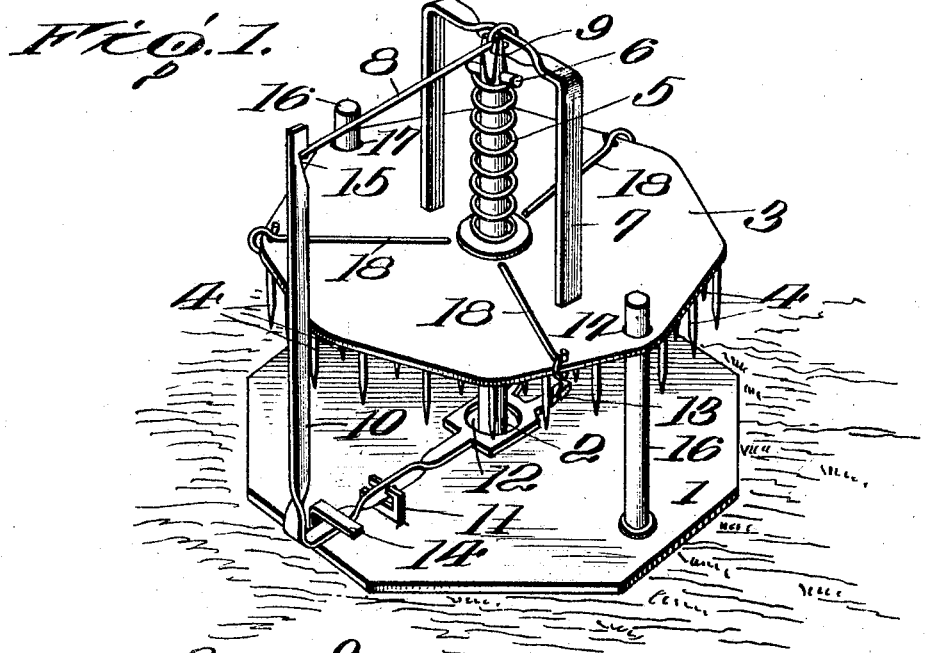
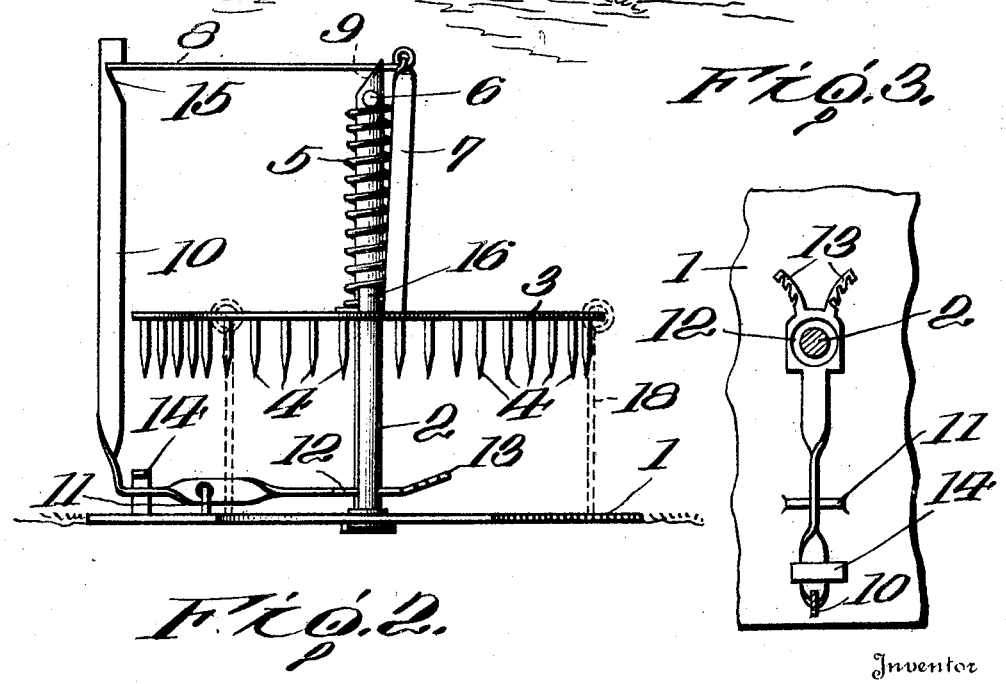
Inventor
BEN PERCICH
By
Attorney Patented Feb. 24, 1925.

1,527,328

UNITED STATES PATENT OFFICE.

BEN PERCICH, OF WARREN, OHIO, ASSIGNOR OF ONE-HALF TO JOHN VENETTA, OF WARREN, OHIO.

RAT TRAP.

Application filed October 10, 1923. Serial No. 667,683.

*To all whom it may concern:*

Be it known that I, BEN PERCICH, a subject of the King of Italy, and resident of Warren, in the county of Trumbull and State of Ohio, have invented certain new and useful Improvements in Rat Traps; and I do hereby declare the following to be a full, clear, and exact description of the invention, such as will enable others skilled in the art to which it appertains to make and use the same.

This invention relates to animal traps and particularly traps for catching rats having the part so arranged that the animal may enter from any point to eat the bait on the bait holder.

This invention includes the provision in a rat trap of a base plate having a post extending upwardly from the center portion on which is slidably mounted an annular disk or smiting member provided with a series of rows of prongs on the underside and normally forced toward said base plate by a coiled spring mounted on the post and secured at the upper end against movement thereon, and a setting mechanism including a bell crank lever pivoted on a projection from the base, having one end provided with an opening receiving the post and a bait holder adjacent said opening, and the other end provided with a notch adapted to cooperate with a lever carried by a bracket on the annular disk for holding the disk in raised position by engagement with the upper end of the post. In this connection a feature of the invention resides in the assemblage of the several independent parts through their connection with the post which is removably secured in the base and holds all of said parts together. Another feature is the provision of means for holding the smiting member in raised position independent of the setting mechanism for the purpose of permitting bait to be applied to the bait holder without danger of injury to the hands in this operation.

The invention is described in detail in the following description and claims and shown in the accompanying drawings in which Figure 1 is a perspective view of the trap in set position. Figure 2 is a side elevation of the trap in set position showing the disk holding bars in operative position in dotted lines, and Figure 3 is a detail plan view of the base plate showing the construction of the bait holder and adjacent parts.

1 indicates a base plate of annular form provided in the central portion with a post 2 extending upwardly therefrom and removably secured thereto. An annular disk 3 forming a smiting member is slidably mounted on said post and is provided on the under surface with a plurality of rows of spikes 4 arranged in staggered relation. A coil spring 5 is mounted on the post above the disk having one end engaging the upper face of said disk and the other end abutting lateral projections 6 on the upper end of the post 2 and normally acting to force said disk toward said base plate. The disk has a bracket 7 of U-shape secured thereto in inverted position which pivotally mounts a lever 8 adapted to seat in a crotch 9 formed on the upper end of the post, the free end of the lever cooperating with a bell crank lever 10. This bell crank lever is pivotally secured to said base plate through sliding engagement with the projection 11 carried by said plate and has one end provided with an opening 12, receiving the post 2 and beyond this opening being formed into a bait holder 13. A bracket 14 prevents disengagement of the bell crank lever from the lateral projection 11 when the post 2 is extended through the opening 12 in the lever, said post serving to hold this lever in assembled relation on the base plate and being further adapted for guiding the lever during its operation. The other end of this bell crank lever is provided with a notch 15 adapted to receive the free end of the lever 8 for setting the smiting member in raised position to be released by an animal pulling upwardly on the bait carried by the bait holder so that the smiting member will be forced downwardly on the animal and catch and kill the same.

To prevent a relative rotary movement of the disk or smiting member on the post with respect to the base plate a pair of guide bars 16 are mounted in the base plate and extend upwardly parallel to the post through openings 17 in opposite edge portions of the disk. In order that the trap may be baited without injuring the person applying the bait a plurality of bars 18 are pivotally secured to the disk in spaced relation about the periphery and adapted in one position to engage the plate and hold the disk spaced from the base plate independent of the setting mechanism and in inoperative position to lie on the upper portion of said base plate.

It will be observed from the foregoing description that the post 2 holds all of the parts in assembled relation with respect to the base plate when secured thereto and that the several parts may be uncoupled upon removal of the post from the base plate. When the bait holder is provided with bait and the trap set it will be noted that an animal may enter the trap from any point to eat the bait and when an upward pull is exerted on the bait holder the bell crank lever will be moved to release the lever 8 which will permit the spring to force the smiting member downwardly to smite the animal regardless of his position in the trap and imprison and kill him.

I claim as my invention:

1. An animal trap comprising an annular base plate having a post mounted in the central portion and extending upwardly therefrom, an annular smiting member having a central opening to receive the post and slidably mounted thereon, an expansion spring mounted on the post and engaging the smiting member for normally forcing it toward the base plate, a setting mechanism for holding the smiting member spaced above the base plate against the tension of the spring, and a plurality of rods pivoted at spaced intervals around the edge of the smiting member adapted to hold the smiting member in open or spaced relation to the base plate independent of the setting mechanism.

2. An animal trap comprising a base plate, a smiting member mounted for reciprocating movement relative to the base plate, means for normally forcing said smiting member toward the base plate, an animal released setting mechanism including a bait holder for setting the smiting member in spaced relation to the base plate, and means carried by said smiting member and movable to a position to engage said base plate for holding the smiting member spaced from the base plate independent of the setting mechanism, to permit placing bait on the bait holder.

3. An animal trap comprising an annular base plate, a post mounted in the center portion of said base plate, an annular disk forming a smiting member slidably mounted on said post, guide rods mounted at opposite points on the base and projecting through openings in the smiting member for guiding said member and holding it against rotative movement on the post, resilient means for normally forcing and holding the smiting member in contact with the base plate, a trigger released holding means for setting the trap with the smiting member in spaced relation to the base, and pivoted members carried by the smiting member adapted for engagement with the base plate to hold the smiting member spaced from the base plate independent of the trigger released means.

4. An animal trap comprising an annular base plate, a post mounted in the center portion thereof, an annular disk forming a smiting member slidable on said post, resilient means carried by the post for normally forcing said disk toward the base plate, and a setting mechanism, including a bell crank removably pivoted to the base plate provided adjacent one end with an opening to receive said post and beyond said opening with prongs forming a bait holder, and adjacent the other end with a notch, a bracket secured to said disk, and a lever pivoted on said bracket adapted to seat on the end of said post and engage the notch in the bell crank lever, for setting said smiting member in spaced relation from the base against the tension of said spring.

5. An animal trap comprising an annular base plate, a post removably mounted in the center portion thereof, an annular disk forming a smiting member slidable on said post, resilient means engaging the post at one end and having the other end engaging the disk for normally forcing the disk toward the base plate, and a setting mechanism, including a bell crank removably pivoted to the base plate, provided adjacent one end with an opening to receive said post and beyond said opening with prongs forming a bait holder, and adjacent the other end with a notch, a bracket secured to said disk, and a lever pivoted on said bracket adapted to seat on the end of said post and engage the notch in the bell crank lever, for setting said smiting member in spaced relation from the base plate against the tension of said spring, said post securing all of the parts together and to said base plate.

In testimony whereof I have signed this specification.

BEN PERCICH.